Oct. 14, 1969    R. H. MILLER ET AL    3,471,934
GAGING METHOD AND APPARATUS
Filed Aug. 26, 1966    2 Sheets-Sheet 1
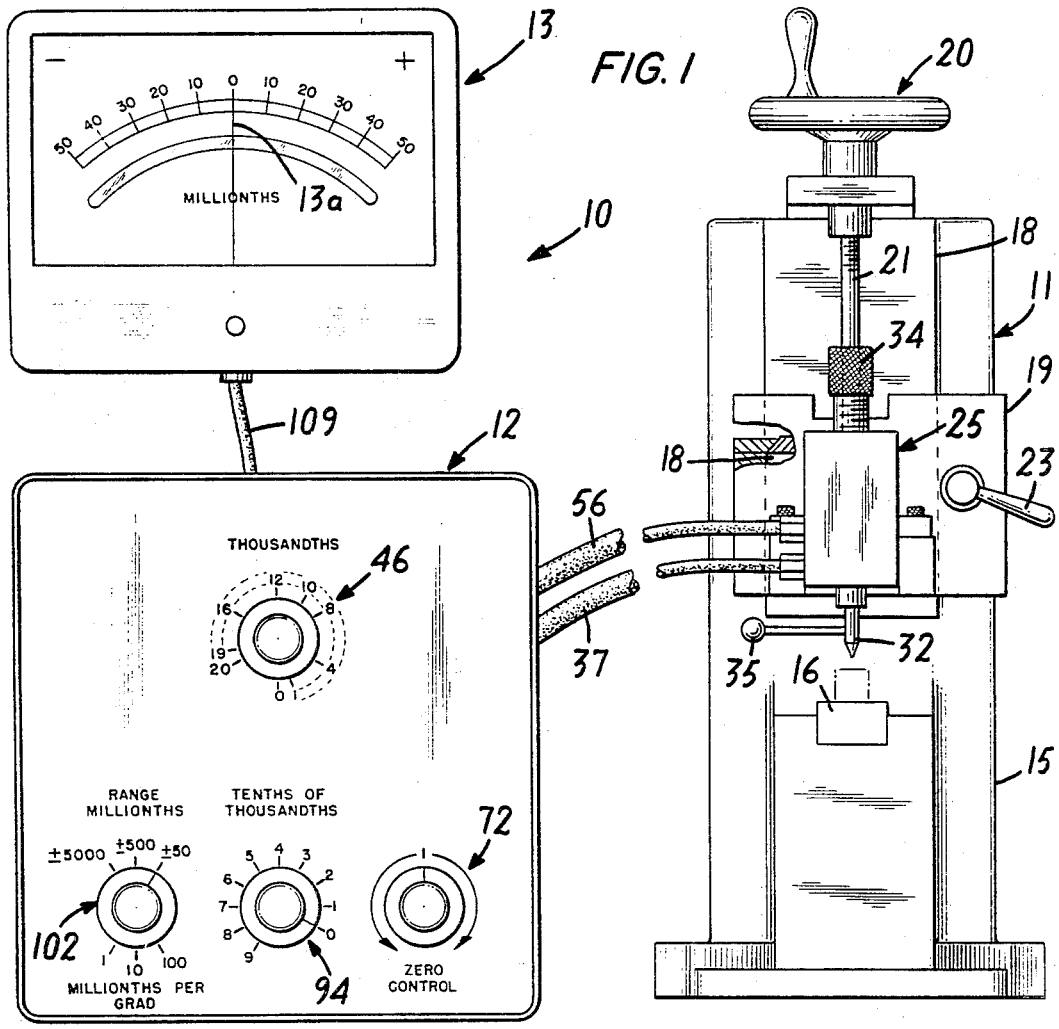
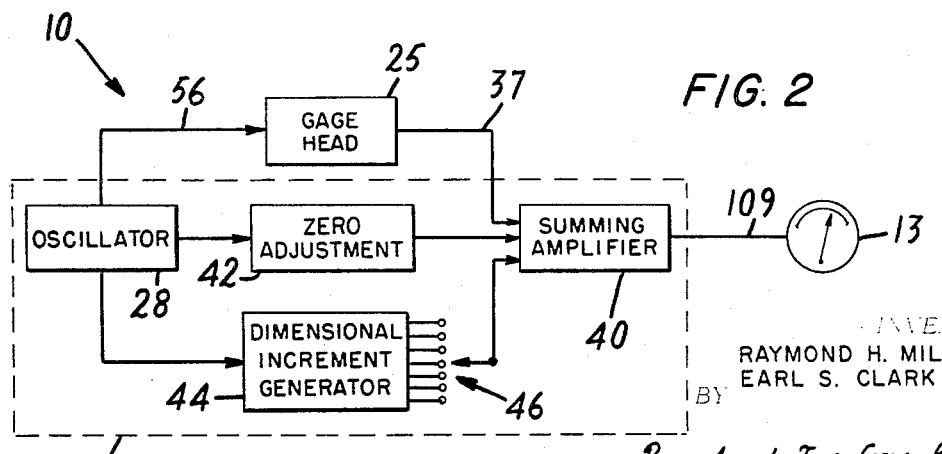
INVENTORS
RAYMOND H. MILLER &
EARL S. CLARK
BY
Brumbaugh, Free, Graves & Donohue
their ATTORNEYS

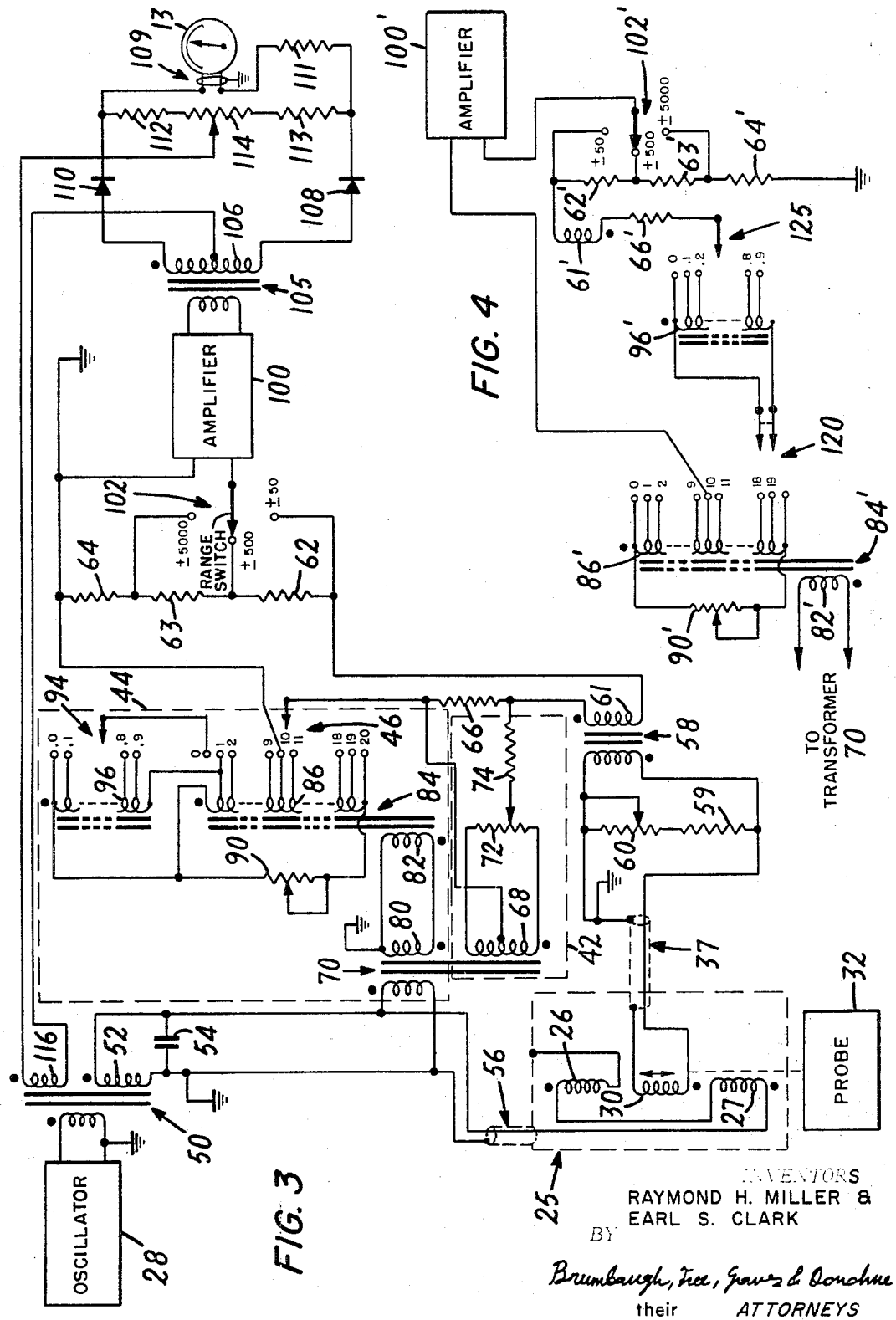

United States Patent Office 3,471,934
Patented Oct. 14, 1969

3,471,934
GAGING METHOD AND APPARATUS
Raymond H. Miller and Earl S. Clark, Warwick, R.I., assignors to Federal Products Corporation, Providence, R.I., a corporation of Rhode Island
Filed Aug. 26, 1966, Ser. No. 575,426
Int. Cl. G01b 3/22
U.S. Cl. 33—172                           12 Claims

ABSTRACT OF THE DISCLOSURE

A system for measuring a dimension of an object by generating an electrical signal in response to the displacement of the probe of an electromechanical transducer, generating a plurality of reference voltage levels representative of reference dimensional increments, comparing the electrical signal with the reference voltage levels and generating a signal representative of the displacement of the probe in relation to the reference dimensional increments.

---

This invention relates to a gaging method and apparatus and, more particularly, to a new and improved method and apparatus for accurately measuring the size of an object. The invention has application for measuring the size of a work piece as well as for checking the accuracy of a family of master or working gage blocks.

It is known to measure the size of a work piece or a gage block by comparing the displacement of a probe by the work to be measured with the displacement of the probe by a known master gage block. Such electronic comparators generally include a gage head which is an electromechanical transducer providing an electrical output signal, the amplitude of which is proportional to the mechanical displacement of the gage head probe by the work piece. The gage head is suitably mounted on a frame provided with a reference contact or anvil, the gage head probe being the movable contact. The probe may be spring-biased, for example, to insure that the work piece or gage block is properly engaged by and between the reference anvil and the probe. Conventional gage heads which may be used in such comparators are disclosed in the Patents Nos. 2,503,851 and 2,631,272, which issued Apr. 11, 1950 and Mar. 10, 1953, respectively.

The gage head is generally coupled through an amplifier to a meter which indicates the amount by which the size of the work differs from the size of the known master gage block, thereby measuring the size of a work piece or determining the error of a working gage block.

Conventional electronic comparators of high precision are of very limited range and therefore require a considerable number of master gage blocks if measurements are to be made of objects of appreciably differing size. Most meters having 100 dial divisions or grads are limited to an accuracy of one percent. Thus if the gain of the amplifier is such that one dial division represents one microinch, the comparator is limited to a range of 0.000100 inch (100 microinches). Accordingly, it is necessary to have a known master gage block within 100 microinches of the size of the work to be measured. The use of such conventional comparators requires a great number of masters, and the mechanical readjustments of the gage head and subsequent zeroing of the meter for each master results in very slow measuring speed. Furthermore, conventional gage blocks are subject to wear, denting, inaccurate handling, dirt and other sources of error, so that the frequent handling of gage blocks necessary in the use of conventional comparators is likely to introduce such error.

Periodically, a set of master gage blocks must be calibrated against standard blocks such as available at the Bureau of Standards, for example. Due to the workload at the calibrating facility, this may take a considerable period of time, during which the masters are unavailable. The user is unable to avoid this inconvenience by using a conventional comparator with several prime masters due to the limited range of a high precision comparator, as discussed above. Thus, a prime master would be required for every master, the range of the comparator being only 100 microinches.

Accordingly, it is an object of the present invention to provide a new and improved gaging method and apparatus which effectively overcomes the above-mentioned shortcomings of conventional apparatus.

Another object of the invention is to provide a novel method and apparatus for making measurements over a relatively wide range with very high precision.

These and other objects and advantages of the invention are attained by generating an electrical signal in response to the displacement of the probe of an electromechanical transducer, generating a plurality of reference voltage levels representative of reference dimensional increments, the reference voltage levels being related to dimensional increments as the electrical signal from the transducer is related to the displacement of the probe, comparing the electrical signal with a selected one of the reference voltage levels, and generating a signal representative of the displacement of the probe in relation to the reference dimensional increment corresponding to the selected reference voltage level.

Other objects and advantages of this invention will be apparent from a reading of the following detailed description in conjunction with the accompanying drawings showing preferred embodiments, wherein:

FIG. 1 is a front elevational view of a typical gaging apparatus in accordance with the invention;

FIG. 2 is a simplified block diagram of the electrical circuit included in the apparatus of FIG. 1;

FIG. 3 is a schematic illustration of the electrical circuit of FIG. 2 according to one embodiment of the invention; and FIG. 4 is a schematic illustration of a portion of the electrical circuit of FIG. 2 according to another embodiment of the invention.

In the particular embodiment of the invention shown in FIGS. 1, 2 and 3, the gaging apparatus 10 includes a gage head unit 11, an electronic unit 12 and an indicating meter 13. The gage head unit 11 includes a frame 15 provided with a reference contact or anvil 16 and includes a dovetail 18 on which is slidably mounted a carriage 19 The carriage 19 may be adjusted along the dovetail 18 by an elevating wheel 20 which drives a screw 21 threadedly received in the carriage 19. The carriage may be secured at any position along the dovetail by means of a clamp 23 which is mounted in the carriage and is adapted to be actuated to bear against the dovetail 18.

Secured to the carriage 19 for motion therewith is a gage head 25 which is an electromechanical transducer which may take the form of a differential transformer as disclosed in the above-mentioned Patent No. 2,503,851. Two fixed primary coils 26 and 27 are driven by a suitable conventional oscillator 28 which may provide an output signal of 100 kilocycles per second, for example. The oscillator is preferably energized by a conventional voltage-regulated power supply. Displaceably mounted in flux-linking relation with the two primary coils 26 and 27 is a secondary coil 30 which may be displaced by a probe 32 to vary the coupling between the primary and secondary coils of the gage head. The primary coils are so wound that when the secondary coil is disposed equidistant therebetween no voltage is induced therein, and when the secondary coil is displaced from its electrical neutral position there is induced therein a voltage of magnitude and phase in accordance with the magnitude and direction of displacement of the probe 32. Such differential transformers provide an electrical output signal which is directly proportional to the mechanical displacement of the probe over a considerable range, as is well-know in the art.

The probe 32 is biased downwardly (as viewed in FIG. 1) by a suitable compression spring (not shown) and this spring may be adjusted by a knob 34 on the gage head to obtain any desired gaging pressure between the probe 32 and the workpiece to be measured. An arm 35 extends laterally from the probe and permits the operator to raise the probe against the action of the compression spring so that a gage block or workpiece may be inserted between the reference anvil 16 and the probe 32 without damaging the probe.

The output from the secondary coil 30 of the gage head head 25 is supplied through a shielded cable 37 to a summing amplifier 40 which has sufficient gain so that the needle 13A of the meter 13 will be displaced by one dial division when the probe 32 is displaced my one millionth of an inch, for example. Another input to the summing amplifier 40 is supplied by a zero adjustment unit 42 which is also driven by the oscillator 28. The zero adjustment unit provides a signal of continuously adjustable magnitude which is either in phase or 180° out of phase with the signal from the gage head 25. In this way, the gage head 25 may be displaced downwardly by the elevating wheel 20 until the probe 32 engages the upper surface of a master block and provides a reading on the meter 13. The zero adjustment unit is then adjusted to provide a signal equal in magnitude to, but out of phase with, the signal provided by the gage head so that the meter is electrically returned to its zero position. Thereafter the master gage block is removed and the workpiece is inserted between the reference anvil and the probe, and the meter 13 will then indicate the amount in microinches by which the size of the work piece differs from the master gage block.

If, however, the dimension of the unknown work piece differs from the size of the master gage block by an amount which exceeds the displacement corresponding to one-half of the range of the meter 13, the indicating needle of the meter will be driven off scale. The needle is brought back on scale by supplying to the summing amplifier a pretermined voltage level of the proper polarity, which corresponds to a predetermined mechanical distance, from a dimensional increment generator 44. The dimensional increment generator supplies a plurality of reference voltage levels which correspond to reference dimensional increments, and the desired reference voltage level may be supplied to the summing amplifier 40 by means of a selector switch 46.

Referring now to the schematic electrical circuit of FIG. 3, the output of the oscillator 28 is supplied to the primary coil of a transformer 50 having a secondary coil 52 across which is a capacitor 54 to provide a resonant circuit tuned to the output frequency of the oscillator 28. The secondary coil 52 is coupled to the primary coils 26 and 27 of the gage head 25 through a shielded cable 56. The secondary coil 30 of the gage head is connected through the cable 37 to the primary coil of a transformer 58, a fixed resistor 59 and an adjustable resistor 60 being series-connected in parallel with the primary of the transformer 58. Adjustment of the variable resistor 60 provides the necessary correction for phase shift suffered by the signal from the gage head 25. The secondary coil 61 of the transformer 58 is connected at one end through three series-connected resistors 62, 63 and 64 to ground. The other end of the secondary coil 61 is connected to one end of a resistor 66, across which the zero adjustment voltage is developed.

The zero adjustment voltage is obtained from a secondary coil 68 of a transformer 70, the primary of which is connected to the secondary coil 52 of the transformer 50. The two fixed terminals of a potentiometer 72 are connected to the opposite ends of the secondary coil 68, and the movable contact of the potentiometer is connected through a resistor 74 to the resistor 66 and the secondary coil 61 of the transformer 58. The secondary coil 68 is provided with a center tap which is connected to the movable contact of the selector switch 46 and to the end of the resistor 66 remote from the transformer 58. Suitable adjustment of the slider of the potentiometer 72 thus provides a zero adjustment voltage across the resistors 66 and 67 of continuously adjustable magnitude, the phase of which is either exactly in phase or 180° out of phase, as desired, with the voltage developed across the secondary coil of the transformer 58, inasmuch as any phase error between the two signals is corrected by suitable adjustment of the variable resistor 60. The resistors 66 and 74 comprise a voltage divider network so that the zero adjustment voltage developed across the resistor 66 is of the desired range.

A secondary coil 80 of the transformer 70 drives the primary coil 82 of a transformer 84 which has a secondary coil 86 provided with twenty taps at which appear twenty reference voltage levels, the electrical increment between adjacent ones of the taps being identical. The transformer 84 is preferably a toroid transformer to facilitate the winding of an equal integral number of turns between adjacent taps. The number of turns on each coil of the transformer 84 is chosen in relation to the number of turns on each coil of the gage head 25 so that the electrical voltage increment between adjacent taps on the secondary coil 86 equals the change in voltage developed by the gage head 25 at the secondary coil of the transformer 58 when the probe 32 is displaced by one thousandth of an inch. Accordingly, the numbers one to twenty assigned to the taps of the coil of the winding 86 represent thousandths of an inch. Inasmuch as the "increment" voltage developed between adjacent taps on the winding 86 and the "displacement" voltage developed across the winding 61 when the movable coil 30 is displaced from its electrical neutral position by 0.001 inch are both proportional to the input voltage supplied to the primary coils 26 and 27 of the gage head, the "increment" voltage signal will balance the "displacement" voltage signal when the displacement of the coil 30 corresponds to the selected tap of the winding 86 regardless of the gage head input voltage, and so a null indication of the meter 13 is unaffected by variations in the output from the oscillator 28.

The center tap of the winding 86 (the number ten "thousandth inch" tap) is grounded and corresponds to the electrical neutral position of the secondary coil 30 of the gage head. If the probe 32 is displaced away from the reference anvil 16 to displace the secondary coil 30 from its electrical neutral position, a signal is generated in the secondary winding 61 of the transformer 58, the phase of which is opposite to that of the reference voltage levels at the taps "11"–"20," so that the reference voltage level at the appropriate one of the taps "11"–"20" will combine with the signal developed at the secondary winding 61 to provide a voltage across the resistors 62, 63 and 64 (disregarding the voltage developed across the resistor 66 by the zero adjustment unit 42) which is less than the electrical increment corresponding to 0.001 inch. Similarly, if the movable coil 30 of the gage head is displaced from the electrical neutral position toward the anvil 16, the signal from the gage head may be "balanced" by the appropriate one of the taps of the secondary winding 86 which are designated "1"–"9" to within the electrical increment corresponding to 0.001 inch.

The phase of the reference level voltages obtained between the movable contact of the selector switch 46 and ground is adjusted to be either exactly in phase, or 180° out of phase, with the zero adjustment voltage developed across the resistor 66 by suitable adjustment of a variable resistor 90 which is connected across the secondary winding 86.

The switch 46 includes a fixed contact designated "0" which is connected to the movable contact of a switch 94, the ten fixed contacts of which are connected to ten equally-spaced taps on a winding 96 which is preferably wound around a toroid to facilitate obtaining an equal integral number of turns between adjacent taps. The opposite ends of the winding 96 are connected to the number "1" tap of the coil 86 and the adjacent end thereof. The taps of the winding 96 are designated "0"–".9," corresponding to tenths of thousandths of an inch, inasmuch as they divide the "1" tap of the winding 86 into ten electrically equal increments.

The combined signals from the gage head 25, the zero adjustment unit 42 and the dimensional increment generator 44 are applied to a suitable conventional amplifier 100 through a conventional attenuator which includes the resistors 62, 63 and 64 and a range switch 102. The range switch permits the selection of a range for the meter 13 of ±50, ±500 or ±5000 millionths of an inch, corresponding to 1, 10 or 100 millionths of an inch per scale division, respectively. The amplifier 100 preferably includes one or more conventional negative feedback networks in order to stabilize the gain of the amplifier against aging of components, etc. which might otherwise alter the gain and cause an inaccurate reading on the meter 13. The meter 13 is calibrated so that the displacement of the indicating needle corresponds with the displacement of the probe 32 by suitable adjustment of the gain of the amplifier 100.

The output of the amplifier 100 is applied to a transformer 105, the secondary winding 106 of which is included in a conventional synchronous detector circuit which functions as a half-wave rectifier circuit to apply a pulsating direct current signal to the direct current meter 13, the movement of which acts to average the pulses applied thereto. One end of the winding 106 is coupled through a diode 108, a resistor 111 and a shielded cable 109 to one terminal of the meter 13, while the opposite end of the winding 106 is coupled through a diode 110 and the cable 109 to the other meter terminal. A parallel branch including a pair of resistors 112 and 113 connected in series with a potentiometer 114 is connected in parallel with the meter 13 and the resistor 111. A center tap provided in the secondary winding 106 and the movable contact of the potentiometer 114 are connected to opposite ends of a secondary winding 116 of the transformer 50.

As is well known, the carrier frequency supplied by the secondary winding 116 to the synchronous detector cuts off the diodes 108 and 110 during one-half of each cycle regardless of the phase of the signal supplied to the detector circuit by the amplifier 100. Accordingly, rectified signals of both polarities can be supplied to the meter to drive the indicator needle 13a in both the positive as well as the neagtive directions from its neutral center position. The movable contact of the potentiometer 114 is adjusted to balance out the carrier signal supplied from the secondary winding 116 so that it does not supply any current through the meter 13. The value of the resistor 111 is selected so that the proper range of current flows through the meter during normal operating conditions.

FIG. 4 shows an alternative dimensional increment generator according to another embodiment of the invention. Corresponding elements of FIGS. 3 and 4 are designated by the same reference numerals, primes being added in FIG. 4. The secondary winding 86' of the transformer 84' is provided with 21 electrically equally spaced taps, 20 of which are designated "0"–"19" corresponding to thousandths of an inch as before. The desired one of the "thousandth inch" reference levels is selected by a double-pole selector switch 120 which includes two movable contacts ganged together so that they are connected to adjacent pairs of the 21 taps on the secondary winding 86'. The two movable contacts of the selector switch 120 are connected to opposite ends of a winding 96' which is provided with 10 electrically equally spaced taps which are designated 0–.9 and which correspond to tenths of thousandths of an inch as before. A single pole selector switch 125 includes a movable contact which is connected to the end of the resistor 66' remote from the winding 61' and which supplies the desired dimensional increment voltage level to the amplifier 100', the tenth "thousandth inch" tap of the secondary winding 86' being grounded as before. With the dimensional increment generator shown in FIG. 4 a calibrated reference voltage level may be selected corresponding to each 0.000100 inch increment over a range of twenty thousandths of an inch.

The embodiment of the invention shown in the schematic diagram of FIG. 3 has particular application for calibrating a set of master or working gage blocks. Such a set of gage blocks generally include ten one-hundred-millionth blocks (0.100000 to .100900 inch) and fifty thousandth blocks (.101000 to .150000 inch). A prime master gage block of .100000 inch, for example, is inserted between the anvil 16 and the probe 32, and the carriage 19 is lowered by the elevating wheel 20 until a reading is obtained on the meter 13. Then the carriage is securely clamped to the dovetail 18 by means of the clamp 23, such clamping generally causing a slight displacement of the meter needle, after which the meter is brought to its neutral position by means of the zero adjustment unit 42 with the range of ±50 millionths of an inch. If desired, a prime master gage block of .120000 inch may be gaged with the selector switch 46 in the "20" position in order to verify that the gage is accurate over its entire range.

By switching the switch 46 to the zero position the one-hundred-millionth gage blocks (.100000 to .100900) are quickly checked by manipulating only the switch 94 and observing any error on the meter 13, which clearly shows an error of one millionth of an inch or less. By manipulating only the switch 46, twenty of the thousandth gage blocks (.101000 to .120000) may be checked. Then the carriage 19 is unclamped and raised, and a prime master gage block of .120000 inch is placed on the anvil 16 and the carriage 19 is lowered until a reading is obtained on the meter 13. After clamping the carriage and zeroing the meter with the zero adjustment unit 42, twenty additional gage blocks may be checked by merely manipulating the switch 46 (.121000 to .140000). A third mechanical readjustment of the carriage 19 enables the checking of 10 additional thousandth gage blocks (.141000 to .150000). Thus with the apparatus of FIG. 3, 60 master or working gage blocks can be checked with only three mechanical readjustments of the gaging apparatus.

The embodiment of the invention including the dimensional increment generator shown in FIG. 4 may also be used to check master or working gage blocks, but it has particular application for the measuring of workpieces, inasmuch as a measurement may be rapidly made to one millionth of an inch over the range of twenty thousandths of an inch. A master gage block within only twenty thousandths of an inch of the size of the work to be measured is required in order to make measurements of such high precision.

The meter 13 is zeroed with a master gage block as before. Then, the work piece is substituted for the master, and the range switch 102' is set at the ±5000 millionths position so that the switch 120 may be quickly turned to a position which brings the meter needle closest to the center of the scale. The range switch and the tenths-of-thousandths switch 125 are then adjusted to return the needle toward the center of the scale at a range of ±50 millionths of an inch, the switches 120 and 125 then indicating the dimension digitally to the nearest tenth of a thousandth of an inch, while the meter 13 provides the last two decimal places.

Even though the gaging apparatus provides precise measurements over such a wide range, the amplifiers 100 and 100' are not required to have a large dynamic range. When a reading is taken, the input signal to the amplifier is always less than the signal corresponding to ±50 millionths of an inch, which might be ±1½ millivolts, for example. Thus, signals from the gage head 25 which might be of considerably greater magnitude are reduced by the outputs of the zero adjustment unit 42, the dimensional increment generator 44, and occasionally the attenuator to provide an input to the amplifier of less than 1½ millivolts.

Although the invention has been described with reference to specific embodiments, modifications and variations may be made by those skilled in the art without departing from the spirit of the invention. For example, it is apparent that the gaging apparatus may be used over a wide range of operating frequencies, and that any suitable electromechanical transducer may be used in the gage head. All such variations and modifications, therefore, are included within the intended scope of the invention as defined by the following claims.

We claim:

1. Gaging apparatus for measuring a dimension of an object comprising
    electromechanical transducer means having a probe adapted to engage the object for generating an electrical signal in response to the displacement of the probe,
    means for generating a plurality of reference voltage levels representative of reference dimensional increments, the reference voltage levels being related to dimensional increments as the electrical signal from the transducer means is related to the displacement of the probe, and
    means for summing the electrical signal with the reference voltage levels to generate continuously an analog signal representative of the displacement of the probe in relation to the reference dimensional increments.

2. Apparatus according to claim 1 including means responsive to the summing means for indicating the displacement of the probe in relation to the reference dimensional increments.

3. Apparatus according to claim 1 including means for feeding a selected one of the reference voltage levels to the summing means.

4. Apparatus according to claim 1 including common means for energizing the electromechanical transducer means and the reference voltage level generating means.

5. Apparatus according to claim 2 including means for supplying a continuously adjustable reference voltage level to the indicating means to set the indicating means at a predetermined reference indication.

6. Gaging apparatus for measuring a dimension of an object for use with an electromechanical transducer which has a probe adapted to engage the object and which generates an electrical signal in response to the displacement of the probe comprising
    means for generating a plurality of reference voltage levels representative of reference dimensional increments, the reference voltage levels being related to dimensional increments as the electrical signal from the transducer is related to the displacement of the probe, and
    means for summing the electrical signal from the transducer with the reference voltage levels and for generating continuously an analog signal representative of the displacement of the probe in relation to the reference dimensional increments.

7. Apparatus according to claim 6 including means responsive to the summing and generating means for indicating the displacement of the probe in relation to the reference dimensional increments, and means for setting the indicating means at a predetermined reference indication.

8. Apparatus according to claim 6 wherein the electromechanical transducer is supplied by a source of electrical energy and the reference voltage level generating means is supplied by the same source of electrical energy.

9. Gaging apparatus for measuring a dimension of an object comprising
    means for generating an alternating current signal,
    electromechanical transducer means coupled to the alternating current signal generating means and having a probe adapted to engage the object for generating an electrical signal in response to the alternating current signal and to the displacement of the probe,
    means coupled to the alternating current signal generating means for generating a plurality of reference voltage levels representative of reference dimensional increments, the reference voltage levels being related to dimensional increments as the electrical signal from the transducer means is related to the displacement of the probe,
    means for summing the electrical signal with a selected one of the reference voltage levels and generating continuously an analog signal representative of the displacement of the probe in relation to the reference dimensional increment corresponding to the selected reference voltage level, and
    means coupled to the summing and generating means and responsive to the representative signal for indicating the displacement of the probe in relation to the selected reference dimensional increment.

10. Apparatus according to claim 9 including means for setting the indicating means at a predetermined reference indication.

11. A method of measuring a dimension of an object comprising the steps of
    generating an electrical signal in response to the displacement of the probe of an electromechanical transducer means,
    generating a plurality of reference voltage levels representative of reference dimensional increments, the reference voltage levels being related to dimensional increments as the electrical signal from the transducer means is related to the displacement of the probe, and
    summing the electrical signal with the reference voltage levels and generating continuously an analog signal representative of the displacement of the probe in relation to the reference dimensional increments.

12. The method according to claim 11 including the step of indicating the displacement of the probe in relation to the reference dimensional increments.

References Cited

UNITED STATES PATENTS

| | | |
|---|---|---|
| 2,437,639 | 3/1948 | Floyd. |
| 2,737,723 | 3/1956 | Graham et al. |
| 3,137,357 | 6/1964 | Brenner _____ 177—50 |

SAMUEL S. MATTHEWS, Primary Examiner